United States Patent [19]
Belik

[11] Patent Number: 5,620,196
[45] Date of Patent: Apr. 15, 1997

[54] RECUMBENT BICYCLE FRAME

[76] Inventor: Jaroslav Belik, 1610 Mulcahy, Rosenberg, Tex. 77471

[21] Appl. No.: 552,671

[22] Filed: Nov. 3, 1995

Related U.S. Application Data

[63] Continuation of Ser. No. 276,856, Jul. 18, 1994, abandoned.

[51] Int. Cl.$^6$ .................................................. B62K 3/02
[52] U.S. Cl. .................... 280/281.1; 280/287; 280/288.1; 52/731.6; 248/903; 428/34.1
[58] Field of Search ................................. 280/220, 281.1, 280/287, 288.1, 288.2, 288.3; 428/34.1, 36.9, 586; 52/730.4, 730.5, 731.2, 731.3, 731.6, 732.1, 732.2; 248/903

[56] References Cited

U.S. PATENT DOCUMENTS

| | | | |
|---|---|---|---|
| 932,546 | 8/1909 | Hedstrom | 280/281.1 |
| 2,153,249 | 4/1939 | Henry | 280/281.1 |
| 3,375,024 | 3/1968 | Bowden | 280/288.3 |
| 3,556,525 | 1/1971 | Deckert | 52/731.6 |
| 3,807,762 | 4/1974 | Ogisu | 280/287 |
| 3,972,529 | 8/1976 | McNeil | 280/819 |
| 3,993,322 | 11/1976 | Van Tijen | 280/281.1 |
| 4,550,927 | 11/1985 | Resele | 280/281.1 |
| 4,917,397 | 4/1990 | Chonan | 280/281.1 |
| 4,977,722 | 12/1990 | Taylor | 52/730.4 |
| 5,072,961 | 12/1991 | Huppe | 280/278 |
| 5,509,678 | 4/1996 | Ullman et al. | 280/281.1 |

OTHER PUBLICATIONS

Recumbent Cyclist, 1993–1994 Buyers Guide, 1993, pp. 1–39.

Primary Examiner—Brian L. Johnson
Assistant Examiner—Victor Johnson
Attorney, Agent, or Firm—Harrison & Egbert

[57] ABSTRACT

A recumbent bicycle frame having a frame tube with a first shoulder area formed on a side thereof. The shoulder area extends for at least a portion of the length of the frame tube. The frame tube has a generally flat exterior surface above the first shoulder area. The frame tube also has a second shoulder area formed on an opposite side of the frame tube from the first shoulder area. The frame tube has a bottom shoulder area formed on the side of the frame. A generally flat exterior surface extends below this bottom shoulder area. An interior passageway extends longitudinally through the frame tube and includes first and second notched areas formed in the wall of the interior passageway. These notched areas receive a reinforcement tubing member therein. First and second slots are formed at the top and at the bottom of the wall of the interior passageway of the frame tube. A clamp member is removably connected to the first and second shoulder areas and has a portion extending across the flat exterior surface. Various components of the recumbent bicycle can be connected to the clamp member.

18 Claims, 7 Drawing Sheets

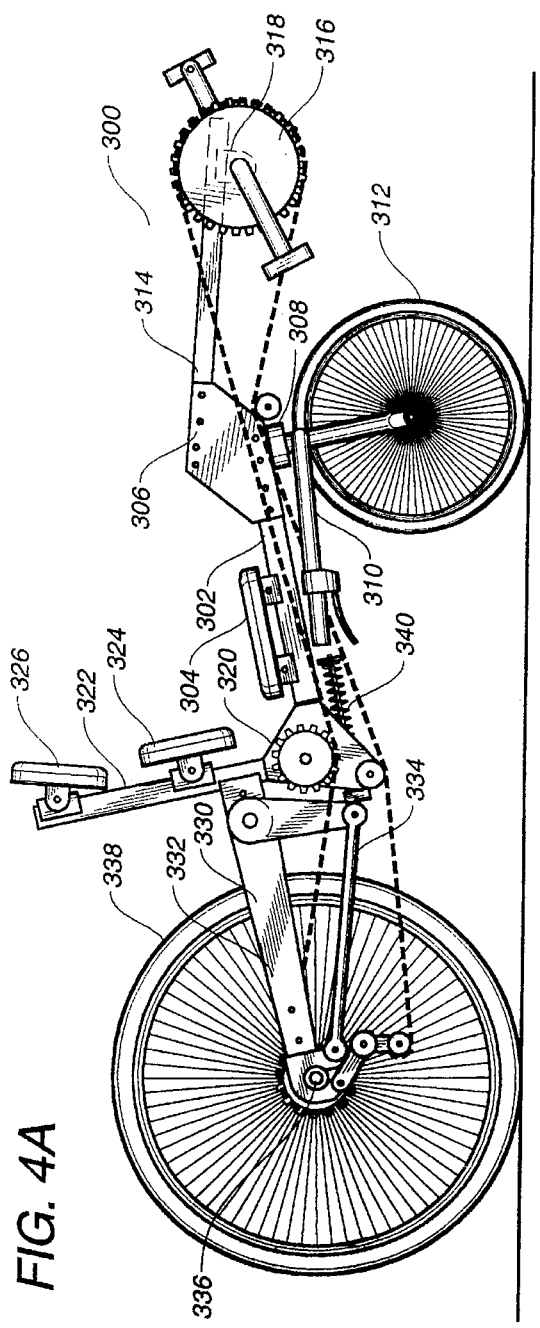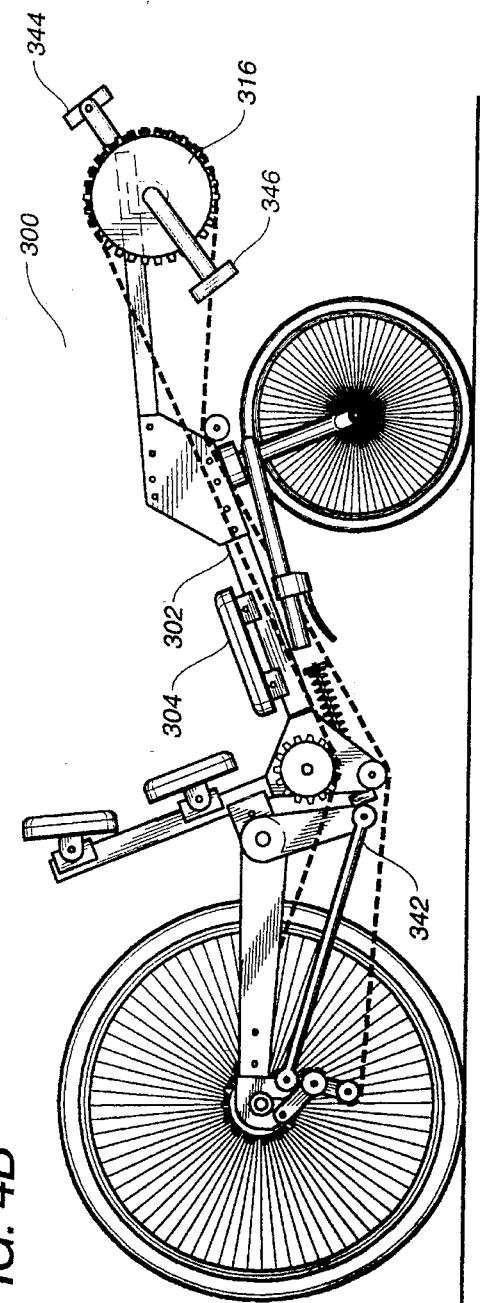
FIG. 4A
FIG. 4B

RECUMBENT BICYCLE FRAME

This is a continuation of application Ser. No. 08/276,856 filed on Jul. 18, 1994 and now abandoned.

TECHNICAL FIELD

The present invention relates generally to bicycles. More particularly, the present invention relates to the frames of recumbent bicycles.

BACKGROUND ART

Bicycles are vehicles having two wheels mounted, one behind the other, to a frame upon which the rider sits. The bicycle is conventionally driven by the rotation of pedals connected to a crankarm, which in turn rotates a front sprocket. The front sprocket is connected to the rear wheel by a chain and rear sprocket, so that the rotation of the pedals forces rotation of the rear wheels. The front wheel is mounted to a front fork that, in turn, is connected to movable handle bars, permitting the front wheel to be turnably steered by the turning of the handle bars.

One form of bicycle is the recumbent bicycle. In the recumbent bicycle, the rider will sit closer to the ground on a bench-type seat, in a truly sitting position with the legs extending forwardly. The pedals and front sprocket are well in front of the rider, but are pedaled in the same fashion as normal bicycles for the propulsive power. The recumbent bicycle has important advantages over the standard bicycle in reduced wind resistance, better downhill performance, and increased comfort of the bench seat over the saddle seat (of regular bicycles).

The recumbent bicycle has been used in bicycle speed trials and in specialty racing, but has not generally received the widespread acceptance of the standard bicycle, despite its many advantages. Typically, recumbent bicycles must be custom designed, generally to the size of the user. As a result, the cost associated with the manufacture of such recumbent bicycles is very expensive. There has been little standardization of design. Currently, recumbent bicycles are made by a large number of very small companies that manufacture recumbent bicycle designs of many forms and fashions.

Typically, conventional recumbent bicycles use a similar frame tube as is used in conventional bicycles. This frame tube is a tube having an annular cross-section. As a result of the annular nature of such tubes, it becomes very difficult to mount the various components onto the frame of the bicycle. It is also very difficult to elongate or to retract the components after they are assembled on such annular tubing. This annular tubing does not provide a convenient means for reinforcement where the forces are greatest. Conventional recumbent bicycles often break, or become damaged, when excessive forces are imparted onto the frame.

In the conventional construction of recumbent bicycles, the various components of the recumbent bicycle must be welded to the frame. The welding of such components to the frame generally makes the components non-removable and non-adjustable. Additionally, the very act of welding components to the frame of the recumbent bicycle will cause a weakness in the metallurgy and mechanical strength of the frame. As such, it would be desirable to avoid the welding of the components to the main structure of the frame.

Furthermore, conventional recumbent bicycle designs are of relatively heavyweight construction. Such heavyweight construction is necessary so as to properly support the forces imparted by the central positioning of the rider between the wheels of the recumbent bicycle. Additional reinforcements are necessary to the structure of the recumbent bicycle than are used on conventional bicycles. These additional structural components add a great deal of weight to the frame.

It is an object of the present invention to provide a frame for a recumbent bicycle that allows for the mechanical attachment of components to the frame.

It is another object of the present invention to provide a recumbent bicycle frame that facilities the installation of reinforcements onto the frame.

Is it a further object of the present invention to provide a recumbent bicycle frame which allows for the adjustable positioning of the various components of the bicycle.

It is still a further object of the present invention to provide a recumbent bicycle frame that is easy to assemble, easy to use, and relatively inexpensive.

It is another object of the present invention to provide a frame that has greater torque stability.

It is still another object of the present invention to provide a recumbent bicycle frame that is relatively lightweight.

These and other objects and advantages of the present invention will become apparent from a reading of the attached specification and appended claims.

SUMMARY OF THE INVENTION

The present invention is a bicycle frame that comprises a frame tube having a first shoulder area formed on a side thereof and extending for at least a portion of the length of the frame tube. The frame tube has a generally flat exterior surface above the first shoulder area. A second shoulder area is formed on an opposite side of the frame tube from the first shoulder area. The frame tube has a bottom shoulder area formed on the side of the frame tube. The frame tube has a generally flat exterior surface below the bottom shoulder area. The flat exterior surface above the first shoulder area is in generally parallel relationship to the flat exterior surface below the bottom shoulder area.

The frame tube has an interior passageway extending longitudinally therethrough. This interior passageway has a first notched area formed in a wall of the interior passageway. The first notched area is formed adjacent to the first side of the frame tube. A second notched area is formed on an opposite side of the wall of the interior passageway from the first notched area. The first and second notched areas slidably receive a reinforcement tubing member therein.

A hole is formed in the side of the frame tube. The reinforcement tubing has an aperture formed therein aperture of the reinforcement tubing member is coaxially aligned with the hole in the side of the frame tube. The reinforcement tubing member extends across the interior passageway.

The frame tube also has a first slot formed below the flat exterior surface above the first shoulder area. The interior passageway has a second slot formed on a wall of the interior passageway opposite the first slot. These first and second slots slidably receive reinforcement tubing members therein. Each reinforcement tubing member extends across the interior passageway.

The flat exterior surface above first shoulder area has at least one bolt receiving opening formed therein.

In the present invention, a clamp means removably engages the first and second shoulder areas and has a portion extending across the flat exterior surface. This clamp member is suitable for having a seat back connected thereto.

When attached to the frame tube, the seat back will extend upwardly from the frame tube. The clamp can also have a seat connected thereto. The seat can be positioned above the flat exterior surface in generally parallel relationship thereto. The clamp can also have a chainring rotatably connected thereto. The chainring is positioned above the flat exterior surface.

Another clamp member removably engages the bottom shoulder member and has a portion extending across the flat exterior surface below the shoulder area. This clamp member has a wheel support means connected thereto. The wheel support means extends outwardly from the frame tube so as to receive an axle of the wheel at an end opposite the frame tube.

In an alternative embodiment of the present invention, a second frame tube can be connected to the first frame tube and extend outwardly therefrom. The second frame tube has a cross-sectional configuration similar to the first frame tube.

BRIEF DESCRIPTION OF THE DRAWINGS

FIGS. 4A–B show side elevational views of an alternative embodiment of the recumbent bicycle frame in accordance with the present invention.

DETAILED DESCRIPTION OF THE INVENTION

Figure 1:
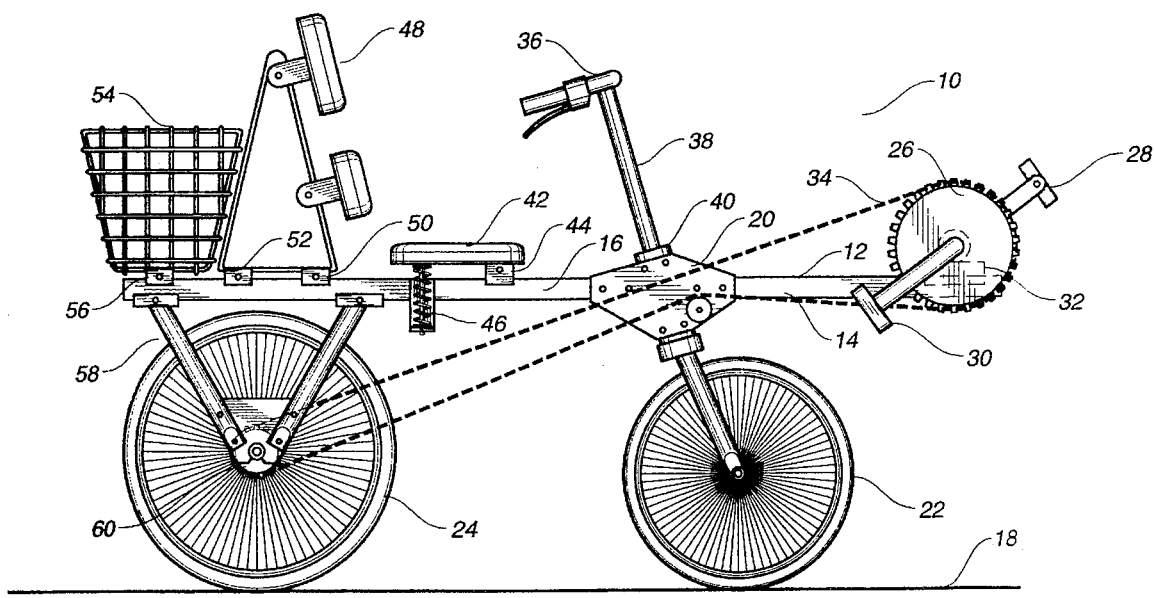
FIG. 1 is a side elevational view of the recumbent bicycle having a frame in accordance with the present invention.

Referring to FIG. 1, there is shown at 10 the recumbent bicycle employing with the frame 12 in accordance with the preferred embodiment of the present invention. As shown in FIG. 1, the frame 12 includes a first frame tube portion 14 and a second frame tube portion 16. A plate-type housing 20 is connected to the frame tube portions 14 and 16 so as to secure such frame portions in their proper positions. The recumbent bicycle 10 is supported on the earth 18 through the use of wheels 22 and 24. Further it can be seen that the first frame tube portion 14 has a chainring 26 affixed thereto such that the chainring 26 is rotatably mounted relative to the frame tube portion 14. The chainring 26 has pedals 28 and 30 extending outwardly therefrom in a conventional fashion. A clamp 32 serves to connect the chainring 26 to the frame tube 12. Chain 34 extends from the chainring 26 to the sprocket of the rear wheel 24. The housing 20 also retains the handle bar 36 in rotatable relationship relative to the frame 12. The handle bar 36 has a stem 38 extending downwardly through bearings 40 and terminating at wheel 22. The handle bars 36 and the stem 38 are mounted within bearings 40 in a conventional manner.

The second frame tube portion 16 has a seat 42 affixed by bracket 44 thereto. A spring 46 is provided so as to provide suitable shock absorbing qualities to the seat 42. A seat back 48 is mounted by brackets 50 and 52 to the frame tube portion 16. The seat back 48 extends upwardly from the frame 12 so as to support the back of the rider of the recumbent bicycle 10. A basket 54 is connected to the frame tube portion 16 through the use of a bracket 56. As can be seen, the chainring 26, the seat 42, the seat back 48, and the basket 54 are mounted so as to extend upwardly from the top surface of the frame 12. The aforementioned brackets can be clamps which can be secured to the frame 12, in the manner to be described hereinafter.

A wheel support frame 58 is affixed by brackets to the bottom side of the frame tube portion 16. The axle 60 of wheel 24 is received in an end of the wheel support frame 58 at an end opposite the frame tube portion 16. It is important to note that the chainring 26 could also be mounted to the underside of the frame 12, if desired.

Figure 2A:
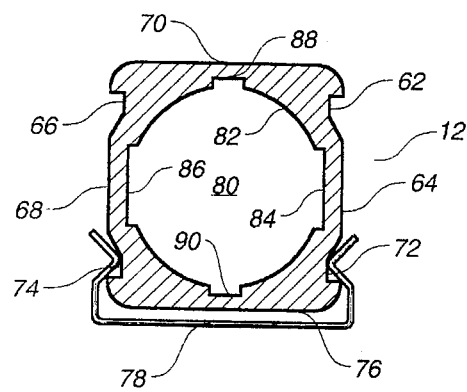
FIGS. 2A–F show a cross-sectional view of the frame in accordance with the present invention, having various clamps connected thereto.

Importantly, in order to achieve the benefits of the present invention, the present invention employs a unique frame tube. FIGS. 2A–F show the configuration of the frame tube 12 of the present invention. In FIG. 2A, it can be seen that the frame tube 12 has a first shoulder area 62 formed on side 64 of the frame tube 12. Another shoulder area 66 is formed on an opposite side 68 of the frame tube 12. The shoulder areas 62 and 64 will extend for the length of the frame tube 12. The frame tube 12 has a generally flat exterior surface 70 formed above the shoulder areas 62 and 64. The frame tube 12 also has a first bottom shoulder area 72 and a second bottom shoulder area 74 formed on sides 64 and 68, respectively. The frame tube 12 has a generally flat exterior surface 76 formed below the bottom shoulder areas 72 and 74. The top flat exterior surface 70 is in generally parallel relationship to the bottom flat exterior surface 76. The sides 64 and 68 are also in generally parallel relationship to each other. The sides 64 and 68 extend in the vertical direction. The top 70 and the bottom 76 extend in the horizontal direction. As can be seen in FIG. 2A, the bottom shoulder areas 72 and 74 receive the ends of a spring clip 78. The bottom surface of the spring clip extends across the bottom flat exterior surface 76 of the frame tube 12. FIG. 2A shows that the spring clip 78 can be easily retained, in a removable fashion, within the shoulder area 72 and 74.

In FIG. 2A, it can be seen that an interior passageway 80 is formed so as to extend longitudinally in the frame tube 12. The interior passageway 80 has a wall 82 of a generally circular configuration. A first notched area 84 is formed in the wall 82 of the interior passageway 80 generally adjacent to the side 64. A second notched area 86 is formed on the opposite side of the wall 82 from the first notched area 84. The second notched area 86 is generally adjacent to the side 68 of the frame tube 12. A first slotted area 88 is formed in the wall 82 of the interior passageway 80 at the top of the interior passageway 80. A second slotted area 90 is formed at the bottom of the interior passageway 80, generally opposite the position of the first slotted area 88. The notched areas 84 and 86 and the slotted areas 88 and 90 serve to receive reinforcement tubing within the interior passageway 80. These areas will extend for the length of the frame tube 12.

Figure 2B:
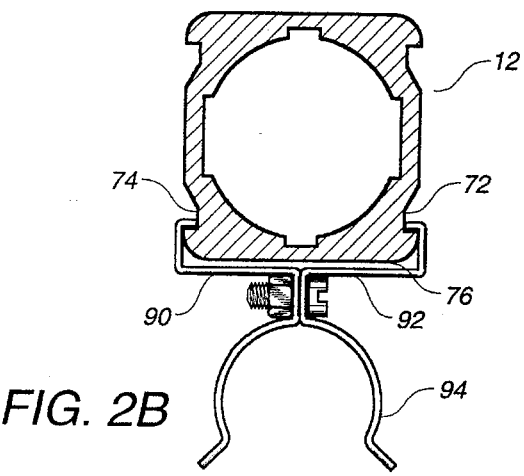

In FIG. 2B, it can be seen that another type of clip 90 can be fastened to the frame tube 12 at the shoulder area 72 and 74. The clip 90 is removably secured to the shoulder area 72 and 74 and has a portion 92 that extends across the bottom flat exterior surface 76. A retaining clamp 94 extends outwardly from the portion 92 so as to be available for the receipt of various items, such as a water bottle, flashlight, pump, etc.

Figure 2C:
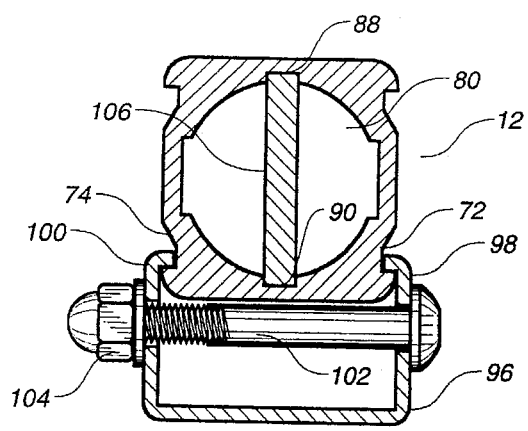

FIG. 2C shows how a strong securing clamp 96 can be affixed to the frame tube 12. The clamp 96 has a first engagement member 98 that engages the shoulder area 72 of the frame tube 12. The clamp 96 also has a second engagement member 100 that engages the shoulder area 74 of the frame tube 12. A bolt 102 extends through the interior of the clamp 96. The tightening of a nut 104 at the end of the bolt 102 serves to draw the engagement members 98 and 100 toward each other so as to strongly secure them against the shoulder areas 72 and 74, respectively. In FIG. 2C, it can be seen that a reinforcing tube, of rectangular cross-section, extends within the interior passageway 80 of the frame tube 12. The reinforcing tube member 106 is slidably received by the first slotted area 88 and the second slotted area 90. The positioning of the reinforcing tube member 106, in the manner shown in FIG. 2C, serves to resist deflections of the frame tube 12 in the vertical direction.

Figure 2D:
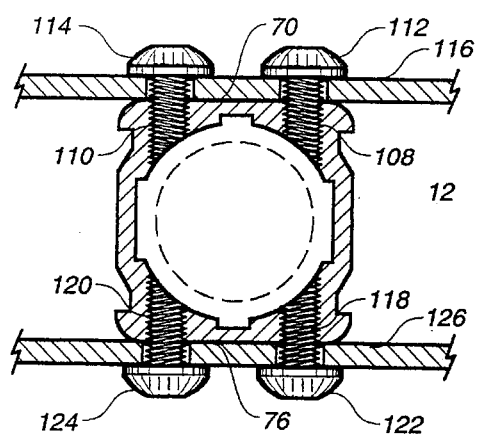

FIG. 2D shows another arrangement of the frame tube 12. In the frame tube 12, the top flat exterior surface 70 has a pair of holes 108 and 110 formed therein. The holes 108 and 110 can be threaded holes so that the frame tube 12 can properly receive the bolts 112 and 114 therein. Bolts 112 and 114 can serve to position a plate 116 in a proper horizontal position in surface-to-surface contact with the top flat exterior surface 70. As such, plate members can be properly secured to the frame tube 12 of the present invention. Similarly, the bottom flat exterior surface can have a pair of holes 118 and 120 formed therein. Holes 118 and 120 serve to receive bolts 122 and 124, respectively. The bolts 122 and 124 serve to position another plate 126 in juxtaposition against the bottom flat exterior surface 76.

Figure 2E:
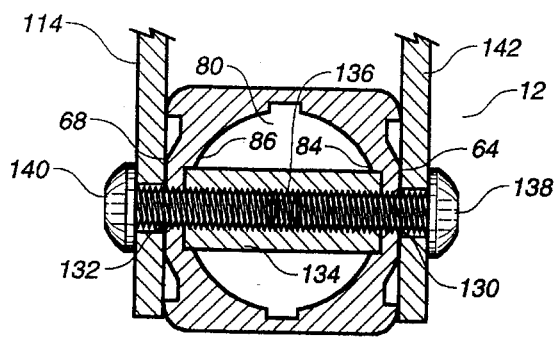

FIG. 2E shows a cross-sectional view of the frame tube 12 of the present invention. In FIG. 2E, it can be seen that the side 64 has a hole 130 formed therein. Similarly, the opposite side 68 has a hole 132 formed therein. The first notched area 84 and the second notched area 86 in the interior passageway 80 of the frame tube 12 receive a reinforcing tubing 134 therein. The notched areas 84 and 86 are positioned such that the reinforcing tubing 134 can be slidably positioned within the interior passageway 80 and extend from side to side across the passageway 80. The reinforcing tube member 134 has an aperture 136 formed therein. It can be seen that the aperture 136 is coaxially aligned with the holes 130 and 132 on the sides 64 and 68, respectively, of the frame tube 12. As such, this arrangement is suitable for the receipt of bolts 138 and 140. Bolt 138 serves to secure a plate 142 in juxtaposition against the side 64. Similarly, the bolt 140 serves to secure a plate 144 in juxtaposition against the side 68. The plates 142 and 144 extend in a vertical direction. The bolts 138 and 140 also serve to secure the reinforcing tube member 134 in its position within the interior passageway 80. The positioning of the reinforcing tube member 134 will serve to resist horizontal deflections of the frame tube 12.

Figure 2F:
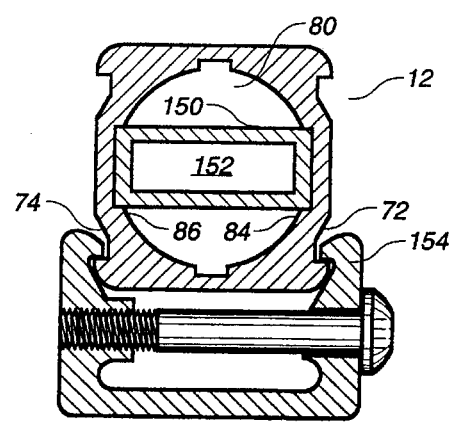

FIG. 2F shows another arrangement of the frame tube 12. In this arrangement, a reinforcing tube member 150 is received within the notched areas 84 and 86 in the interior passageway 80 of the frame tube 12. The reinforcing tube member 150 has a generally rectangular configuration with an open interior 152. This arrangement facilitates the ability of the frame tube 12 to resist horizontal deflections. A clamp 154 is received within the shoulder areas 72 and 74.

By the illustrations of FIGS. 2A–F, the frame tube 12 is adaptable for the receipt of various clamps and various reinforcing structures. The reinforcing structures can be positioned within the interior of the frame tube 12 wherever it is necessary to bolster the strength of the frame tube 12. The orientation of the reinforcing tubing can be adjusted, as needed, to resist the anticipated deflections of the frame tube 12. The shoulder areas formed at the top and bottom of the frame tube 12 can receive various types of clamps. Clamps can be securely fastened to the frame tube 12 as needed. With reference to FIG. 1, it can be seen that various items such as the chainring 26, the seat 42, the seat back 48, the basket 54, and the wheel support frame 58 can be secured to the frame tube 12 through the use of various clamps (as specifically illustrated in FIGS. 2C and 2F). The square tubing can also provide the benefit of torque stability in comparison with conventional tubing.

Figure 3A:
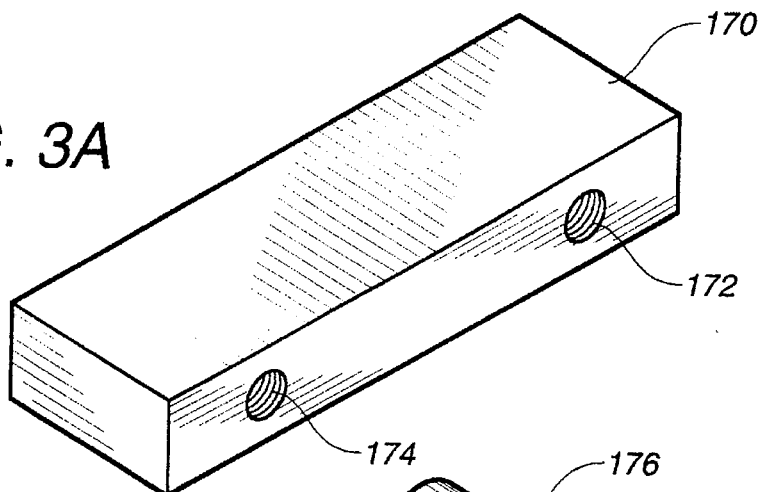
FIGS. 3A–D show perspective views of various reinforcement tubing members as used within the frame of the present invention.

FIGS. 3A–D show various reinforcing tube members that can be employed within the interior passageway 80 of the frame tube 12. FIG. 3A shows a reinforcing tube member 170 having a pair of threaded openings 172 and 174. The reinforcing tube member 170 can be received within the slotted areas or the notched areas on the interior of the frame tube 12. The threaded openings 172 and 174 can be aligned with holes formed on the sides and/or top of the frame tube 12.

Figure 3B:
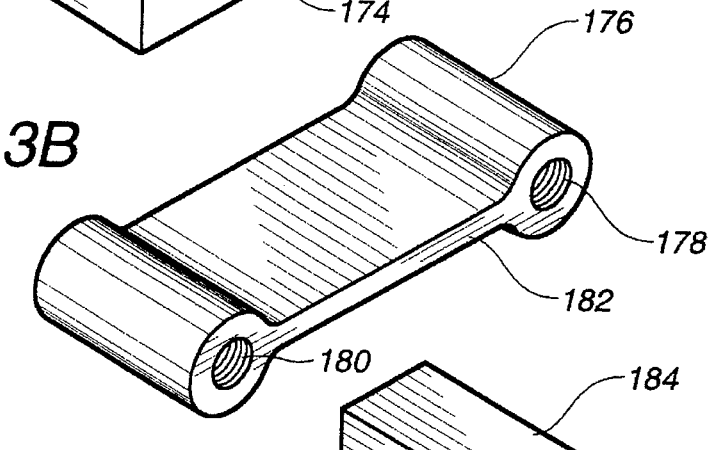
Figure 3C:
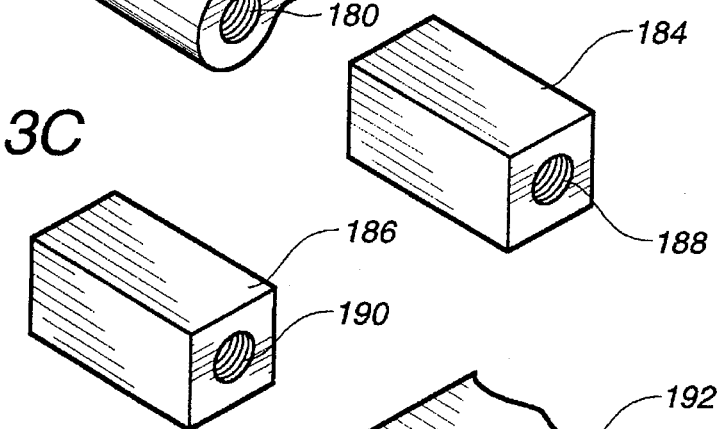
Figure 3D:
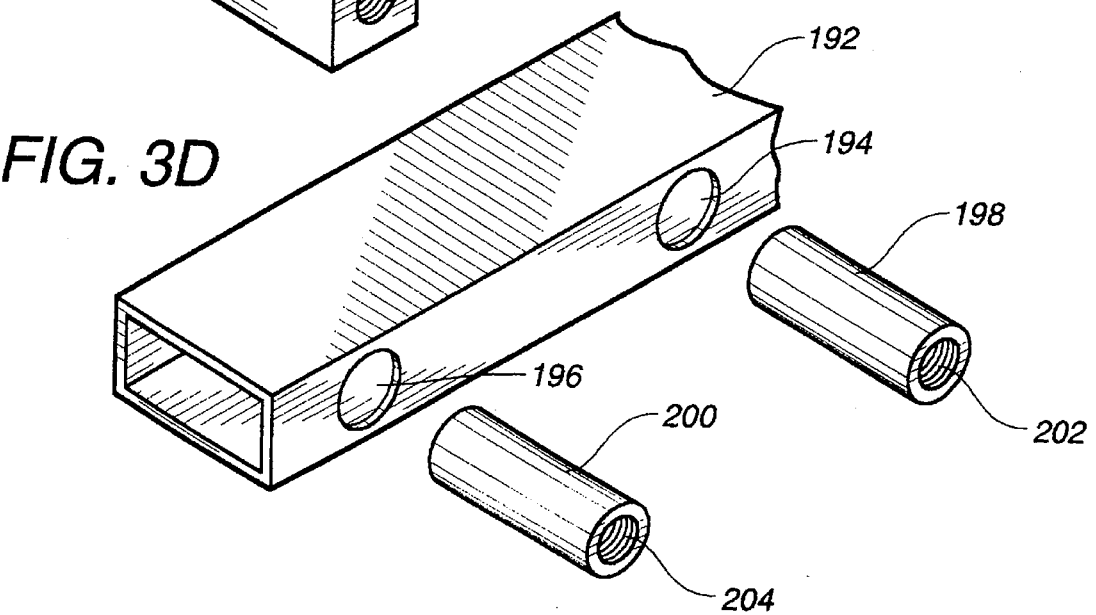

FIG. 3B shows a reinforcing tube member 176 that has a pair of threaded openings 178 and 180 formed therein. A narrow strut 182 extends between the openings 178 and 180 so as to provide structural stability for the reinforcing tube member 176. FIG. 3C shows a pair of members 184 and 186 that can be slidably received within the notched or slotted areas in the interior passageway 80 of the frame tube 12. The member 184 has a threaded opening 188 that can be aligned with a hole formed on the frame tube. Similarly, the member 186 has a threaded openings 190 that can also be aligned with the holes formed on the frame tube 12. The members 184 and 186 can be positioned so as to extend across the frame tube and can be installed wherever it is necessary to affix plate structures or other members to the exterior of the frame tube 12. FIG. 3D shows another alternative arrangement of a reinforcing tube member 192 that has a pair of apertures 194 and 196 formed therein. Apertures 194 and 196 receive tubular members 198 and 200 therein. The tubular members 198 and 200 have threaded openings 202 and 204, respectively. The tubular members 198 and 200 can be slidably received within the reinforcing tube member 192 and extend across the interior of the reinforcing tube member 192.

FIG. 4A shows an alternative embodiment 300 of the recumbent bicycle in accordance with the present invention. The recumbent bicycle 300 includes a frame tube 302 that supports a seat 304 thereon. A plate-type housing 306 is secured to an end of the frame tube 302 and extends upwardly therefrom. The frame tube 302 and the plate-type housing 306 supports the bearing arrangement 308 associated with the handle bars 310 and the front wheel 312. The plate-type housing 306 secures another frame tube 314 thereto. Frame tube 314 has a cross-sectional configuration similar to that of the first frame tube 302. The second frame tube 314 extends downwardly, at a slight angle, from the housing 306. The chainring 316 is secured by a clamp 318 to the bottom flat exterior surface of the frame tube 314. The seat 304 is supported above the first frame tube 302 in generally parallel relationship to the top flat exterior surface of the frame tube 302.

Another plate-type housing 320 is affixed to the exterior of the frame tube 302 in a manner similar to that as illustrated in FIG. 2E. Another frame tube 322 is secured by the plate-type housing 320 such that the frame tube 322 extends generally upwardly, at a right angle, to the frame tube 302. Seat-back portions 324 and 326 are secured, by clamps to the frame tube 322.

In FIG. 4A, it can be seen that a wheel support frame 330 is secured to the frame tube 322 and is also secured to the frame tube 302 through the use of the plate-type housing 320. Arms 332 and 334 extend outwardly from the frame tubes 322 and 302 so as to receive the axle 336 of the rear wheel 338. The configuration of the incumbent bicycle 300 is designed for racing and/or speed. Importantly, a shock absorber 340 allows for relative rotational movement of the rear wheel 338 with respect to the frame tube 302. As such, the embodiment of the invention illustrated in FIG. 4A employs a novel shock-absorbing system.

Importantly, it can be seen in FIG. 4B that the incumbent bicycle 300 can be adjusted upwardly or downwardly depending on the desired orientation of the user. In FIG. 4B, it can be seen that another arm 342 can be installed in place of the previously recited arm 334 (illustrated in FIG. 4A). Arm 342 has a greater length than that of arm 334. This causes the frame tube 302 to angle downwardly such that the operator of the bicycle will be positioned at seat 304 at a lower position relative to the chainring 316 and the associated pedals 344 and 346. This arrangement gives the operator of the bicycle a lower profile, greater aerodynamic capabilities, and potentially greater speeds. If it is difficult to replace the arm 334 with the longer arm 342, then the longer arm 342 can be employed and would include a variety of openings, along its length, so that the angle of the bicycle can be varied in a quick and easy manner.

Figure 5:
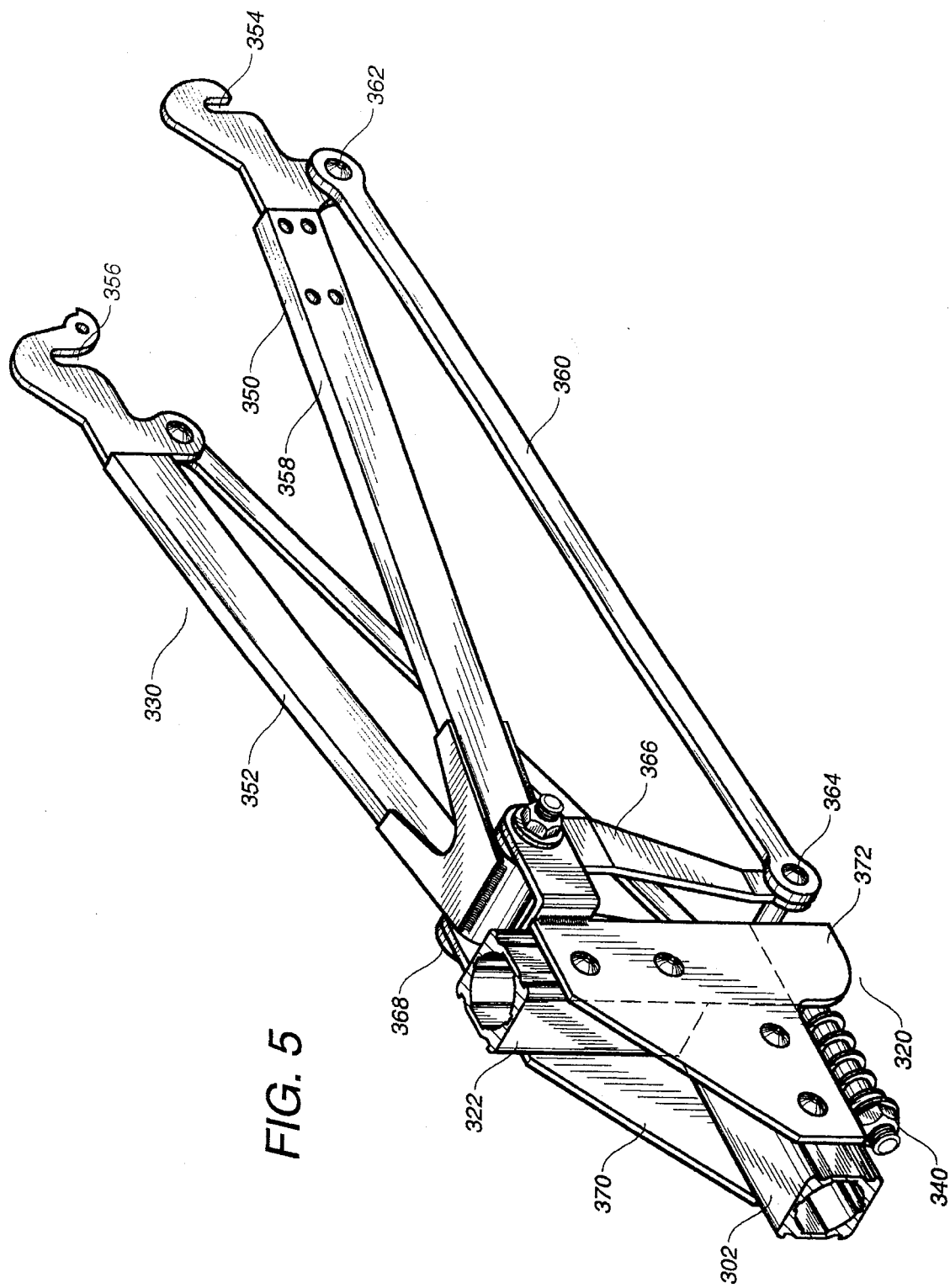
FIG. 5 is a perspective view of the wheel support frame as used in the alternative embodiment of FIGS. 4A–B.

FIG. 5 shows a more detailed view of the arrangement of the wheel support frame 330. It can be seen that the wheel support frame 330 has a first fork 350 and a second fork 352. An axle-receiving receptacle 354 is formed at an end of the fork 350 and another axle-receiving receptacle 356 is formed at an end of the fork 352. The fork 350 employs a first arm 358 and a second arm 360. The first arm 358 corresponds to the arm 332 (illustrated in FIG. 4A). The second arm 360 corresponds with the arm 334 (illustrated in FIG. 4A). A pivotal connection 362 is formed at the end of the arm 360. The second fork 352 employs a similar and symmetrical arrangement. A pivot point 364 is also formed at the opposite end of the arm 360 from the pivot point 362. A support arm 366 extends downwardly from the end of the first arm 358 toward the pivot point 364. A bolt 368 is provided at the end of the forks 350 and 352 so as to allow for relative rotation between the wheel support member 330 and the frame tubes 322 and 302. The plates 370 and 372 form the plate-type housing 320 (illustrated in FIG. 4A). A shock absorber 340 is formed at the bottom of the plate-type housing 320 and below the frame tube 302. The shock absorber 340 is a compression spring which serves to resist relative movement of the wheel support member 330 away from the back surface of the frame tube 322. Whenever shocks occur to the back wheel 338, the shock absorber 340 will resist the angular movement of the support arm 366. As such, the present invention provides novel shock-absorbing capability. It can be seen through the embodiments of the present invention that the height and posture of the rider can be adjusted, as desired. For example, a lower profile can be used for racing. A higher profile can be used for touring.

Figure 6:
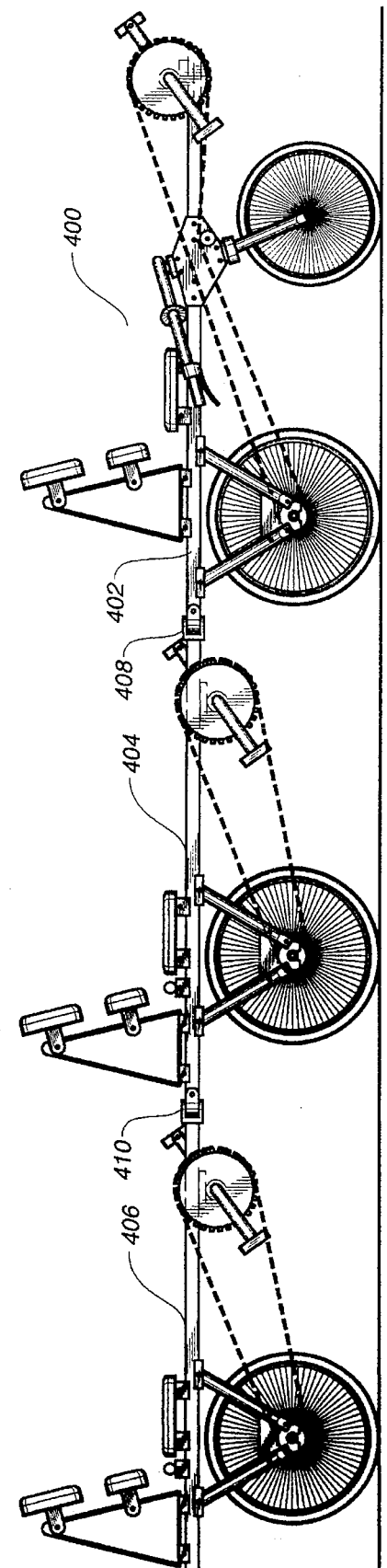
FIG. 6 is a side elevational view of a second alternative embodiment of a multi-person frame of the present invention.

FIG. 6 shows another alternative embodiment 400 of the present invention. It can be seen that a multi-person recumbent bicycle can be created by the connection of a frame tube 402 to a frame tube 404 of an adjacent cycle arrangement. Similarly, the end of the frame tube 404 can be connected to another frame tube 406 so as to allow for the assemblage of a three-person recumbent bicycle. The frame tubes 402, 404, and 406 will have a configuration similar to that described herein previously. An yoke 408 is provided between the frame tubes 402 and 404 so as to allow for relative movement in a horizontal plane between the frame tubes 402 and 404. A similar yoke 410 is provided between the frame tubes 404 and 406. It can be seen that the various other items identified in FIG. 6 can be affixed to the various frame tubes in the manner described herein previously. Whenever it is desired to separate the components, then the frame tube 402 can be separated from the frame tube 404 by a simple means, such as unbolting, such that a single user of the bicycle can employ the recumbent bicycle at the front of the bicycle 400.

Figure 7:
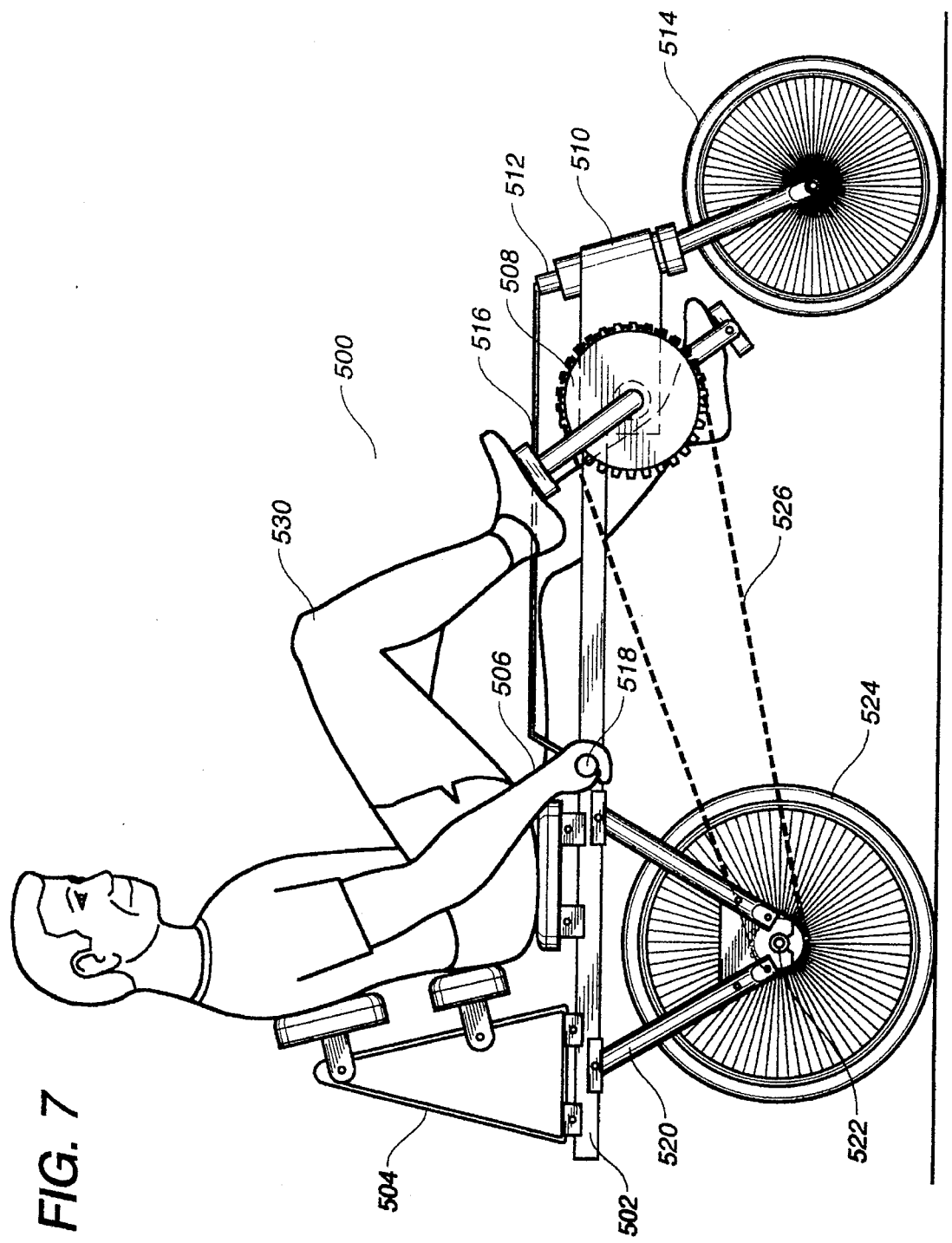
FIG. 7 is a side elevational view of a third alternative embodiment of the present invention.

FIG. 7 shows an alternative embodiment 500 of the recumbent bicycle of the present invention. The recumbent bicycle 500 includes a frame 502 having a configuration similar to that described herein previously. A back rest 504, and a seat 506 are clamped to the top surface of the frame 502. The chain ring 508 is supported on a plate structure 510 at the forward end of the frame 502. As can be seen, the plate structure 510 is affixed to the sides of the frame 502. The plate structure 510 also includes the bearing structure for the steering mechanism 512. The plate structure can be affixed to the frame 502 in the manner illustrated in FIG. 2E hereinbefore. The steering mechanism 512 is connected to the front wheel 514. The steering arm 516 extends rearwardly from the steering mechanism 512 in generally parallel relationship to the top surface of the frame 502. Handle bars 518 are provided below the arm 516 and are positioned below the seat 506. It can be seen that the chain wheel 508 is also positioned below the level of the frame 502. A rear wheel support frame 520 is clamped to the bottom side of the frame 502 and receives the axle 522 of the rear wheel 524. Chain 526 connects the chain wheel 508 to the sprocket of the rear wheel 524. The configuration of the recumbent bicycle 500 allows the rider 530 to assume a more upright posture and allows the rider to steer the recumbent bicycle 500 in a more aerodynamic fashion.

The foregoing disclosure and description of the invention is illustrative and explanatory thereof. Various changes in the details of the illustrated configuration may be made within the scope of the appended claims without departing from the true spirit of the invention. The present invention should only be limited by the following claims and their legal equivalents.

I claim:

1. A bicycle frame comprising:

a frame tube of unitary construction, said frame tube having a longitudinally extending, generally circular interior passageway and a first shoulder area intended inwardly in an exterior side of said frame tube adjacent a top surface of said frame tube, said first shoulder area extending continuously along an entire length of said frame tube, said top surface being a generally flat exterior surface extending along the length of said frame tube above said first shoulder area, said frame tube having a second shoulder area indented inwardly in an opposite exterior side of said frame tube from said first shoulder area, said second shoulder area extending continuously along the entire length of said frame tube adjacent said top surface, said frame tube having a bottom shoulder area indented inwardly in said exterior side of said frame tube adjacent a generally flat bottom exterior surface, said bottom shoulder area and said bottom exterior surface below said bottom shoulder area extending along the length of said frame tube.

2. The frame of claim 1, said top surface being in generally parallel relationship with said bottom exterior surface below said bottom shoulder area.

3. The frame of claim 1, said frame tube having an interior passageway extending longitudinally therethrough, said interior passageway having a first slot formed below said first exterior surface above said first shoulder area, said interior passageway having a second slot formed in a wall of said interior passageway opposite said first slot, said first and second slots slidably receiving a reinforcement tubing member therein, said reinforcement tubing member extending across said interior passageway.

4. The frame of claim 1, said flat exterior surface above said first shoulder area having at least one bolt receiving opening formed therein.

5. The frame of claim 1, further comprising:
a clamp member removably engaging said bottom shoulder member, said clamp member having a portion extending across said flat exterior surface below said bottom shoulder area.

6. The frame of claim 5, said clamp member having a wheel support means connected thereto, said wheel support means extending outwardly from said frame tube, said wheel support means for receiving an axle of a wheel thereon.

7. The frame of claim 5, said clamp means having a chainring rotatably connected thereto, said chainring positioned below said frame tube.

8. The frame of claim 1, further comprising:
a second frame tube connected to said frame tube and extending outwardly therefrom, said second frame tube having a cross-sectional configuration identical to said first frame tube.

9. The frame of claim 1, said frame tube extending generally horizontally between a first wheel and a second wheel of the bicycle, said frame tube having a chainring rotatably connected thereto, said chainring positioned above said frame tube.

10. A bicycle frame comprising:
a frame tube having a planar exterior top surface and a planar exterior bottom surface, said frame tube having a first shoulder area indented inwardly in an exterior side between said top and bottom surfaces, said first shoulder area extending for at least a portion of a length of said frame tube, said first shoulder area being adjacent said top surface, said frame tube having a second shoulder area indented inwardly in said exterior side adjacent said bottom surface, said first and second shoulder areas being separate indented areas on said exterior side, said frame tube having a generally circular interior passageway extending longitudinally therethrough, said interior passageway having a first notched area formed in a wall of said frame tube, said first notched area extending continuously for an entire length of said frame tube, said first notched area extending into the wall for less than an entire thickness of the wall.

11. The frame of claim 10, said first notched area formed adjacent said side, said interior passageway having a second notched area formed opposite said first notched area, said second notched area extending for the entire length of said interior passageway.

12. The frame of claim 10, said first notched area slidably receiving a reinforcement tubing member therein.

13. The frame of claim 12, said side of said frame tube having a hole formed therein, said reinforcement tubing member having an aperture formed therein.

14. The frame of claim 11, said first notched area and said second notched area slidably receiving a reinforcement tubing member therein, said reinforcement tubing member extending across said interior passageway.

15. A bicycle frame comprising:
a frame tube having a longitudinally extending, generally circular interior passageway and a first shoulder area formed on an exterior side thereof so as to extend inwardly in said exterior side, said frame tube having a second shoulder are formed on an opposite exterior side of said frame tube from said first shoulder area so as to extend inwardly in said opposite exterior side, said frame tube having a generally flat exterior surface above said first and second shoulder areas, said flat exterior surface and said first and second shoulder areas extending longitudinally along at least a portion of a length of said frame tube; and
a clamp means removably engaging said first and second shoulder areas of said frame tube, said clamp means extending across said flat exterior surface, said clamp means for supporting an item in an outward position relative to said frame tube.

16. The frame claim 15, said clamp means having a seat back connected thereto, said seat back extending upwardly from said frame tube.

17. The frame of claim 15, said clamp means having a seat connected thereto, said seat positioned above said flat exterior surface in generally parallel relationship thereto.

18. The frame of claim 15, said clamp means having a chainring rotatably connected thereto, said chainring positioned above said flat exterior surface.

\* \* \* \* \*